US005467541A

United States Patent [19]

Greer et al.

[11] Patent Number: 5,467,541

[45] Date of Patent: Nov. 21, 1995

[54] ELECTRONIC IMPLEMENT CONTROL

[75] Inventors: Robert D. Greer, Peoria; Daniel E. Henderson, Washington; Javad Hosseini; Noel J. Rytter, both of Peoria; Gerald P. Simmons, Morton, all of Ill.

[73] Assignee: Caterpillar Inc., Peoria, Ill.

[21] Appl. No.: 30,286

[22] PCT Filed: Sep. 26, 1991

[86] PCT No.: PCT/US91/07004

§ 371 Date: Sep. 26, 1991

§ 102(e) Date: Sep. 26, 1991

[87] PCT Pub. No.: WO93/06313

PCT Pub. Date: Apr. 1, 1993

[51] Int. Cl.[6] .......... G05D 1/02

[52] U.S. Cl. .......... 37/348; 414/699; 364/424.07

[58] Field of Search .......... 37/348; 414/699; 74/540; 172/2; 364/424.07

[56] References Cited

U.S. PATENT DOCUMENTS

| | | | |
|---|---|---|---|
| 3,782,248 | 1/1974 | Fuzzell | 414/699 X |
| 3,836,032 | 9/1974 | Geier | 214/764 |
| 4,011,959 | 3/1977 | Papasideris | 414/699 |
| 4,141,258 | 2/1979 | Walzer | 74/540 |
| 4,377,043 | 3/1983 | Inui et al. | 414/699 X |
| 4,844,685 | 7/1989 | Sagaser | 414/699 X |
| 4,864,746 | 9/1989 | Fukumoto | 37/103 |
| 5,000,650 | 3/1991 | Brewer et al. | 414/699 |
| 5,046,312 | 9/1991 | Tsuda et al. | 60/493 |
| 5,052,883 | 10/1991 | Morita et al. | 414/700 |
| 5,083,894 | 1/1992 | Ikari et al. | 414/700 |

FOREIGN PATENT DOCUMENTS

| | | |
|---|---|---|
| 0125991 | 11/1984 | European Pat. Off. . |
| 0362394 | 4/1990 | European Pat. Off. . |
| 2633987 | 1/1990 | France . |
| WO90/02230 | 3/1990 | WIPO . |

*Primary Examiner*—Randolph A. Reese
*Assistant Examiner*—Victor Batson
*Attorney, Agent, or Firm*—Steven R. Janda; James R. Yee

[57] ABSTRACT

Vehicles (12) having implements (14) are typically used to perform repetitive functions in work cycles. Advantageously, such vehicles (12) include control systems (10) for maintaining a control lever (26) in a predetermined position until an associated work cycle function is completed. The subject control (10) includes a rocker bar (46) connected to the control lever (26) and a solenoid (50) having an actuator rod (52) disposed adjacent the rocker bar (46). The control (10) energizes the solenoid (50) to hold the control lever (26) in the predetermined position in response to a position of the implement (14), a position of the control lever (26), and a desired kickout position.

15 Claims, 3 Drawing Sheets

ELECTRONIC IMPLEMENT CONTROL

TECHNICAL FIELD

This invention relates generally to levers for controlling work vehicle implements, and more particularly, to detent mechanisms for maintaining control levers in a predetermined position.

BACKGROUND ART

Vehicles such as wheel type loaders include work implements capable of being moved through a number of positions during a work cycle. Such implements typically include buckets, forks, and other material handling apparatus. The typical work cycle associated with a bucket includes positioning the bucket and associated lift arm in a digging position for filling the bucket with material, a rackback position, a raised position, and a dumping position for removing material from the bucket.

Control levers are mounted at the operator's station and are connected to a hydraulic circuit for moving the bucket and/or lift arms. The operator must manually move the control levers to open and close hydraulic valves which in turn cause the implement to move. For example, if the lift arms are to be raised, the operator moves the control lever associated with the lift arm hydraulic circuit to a position at which a hydraulic valve causes pressurized fluid to flow to the rod end of a lift cylinder thus causing the lift arms to rise. The operator must manually hold the hydraulic valve open with the control lever until the lift arms reach the desired height. When the operator returns the control lever to a neutral position, the hydraulic valve closes and pressurized fluid no longer flows to the lift cylinder.

To perform a work cycle in the most efficient manner, the operator must steer the vehicle while simultaneously operating both the lift arm control lever and the bucket control lever. Such operation can be tiresome and difficult, particularly for inexperienced operators.

However, since the implement is moved through the same positions each time the work cycle is repeated, control systems can be included to automate some of the work cycle functions thus reducing the operator's work load. Such control systems often provide predetermined positions for the vehicle implements which are associated with the above listed work cycle functions. When the operator moves a control lever beyond a preselected position at which the associated hydraulic valve is open, detents hold the control lever in that position. The detent continues to hold the control lever in this position until the lift arm or bucket reaches the predetermined position. When the control system senses that the implement has reached the predetermined position, the control system releases the detent. Since the control levers are typically spring biased towards a neutral position at which the hydraulic valve is closed, the control lever returns to the neutral position and the movement of the lift arm or bucket is stopped when the detent is released. Once the control lever is moved beyond the predetermined position, the control system allows the operator to release the control lever and concentrate on the next function to be performed.

Many such devices have been developed. One such device is described in U.S. Pat. No. 4,141,258, issued to Walzer on Feb. 27, 1979. Walzer discloses a mechanical detent system which includes a roller that is spring biased toward an engaged position with respect to a notch on the control lever. A solenoid is provided for controllably moving the roller in a direction away from the engaged position and a lost-motion slot is included to allow the operator to manually release the control lever from the detent position. While this arrangement adequately performs the necessary operations, it includes a large number of moving parts which increase maintenance and warehousing space.

Another detent mechanism is described in U.S. Pat. No. 3,915,325 issued to Lark et al. on Oct. 28, 1975. This mechanism utilizes electromagnets to hold the control lever in the desired position. Potentiometers are connected to the implement and to a mechanism for setting the desired implement position. When the potentiometers are producing substantially different signals, the electromagnet is energized. If the control lever is moved such that a latching means is relatively close to the electromagnet, then the electromagnet will attract the latching means with sufficient force to hold the control lever in that position. When the implement reaches the desired position, the two potentiometers produce nearly identical signals which causes the electromagnet to be deenergized. This in turn causes the control lever to return to the neutral position. While this arrangement reduces the number of moving parts, the electromagnets are energized whenever the implement is not in the desired position. For example, the detent mechanism is activated in situations in which the operator only moves the control lever a small amount and has no desire to put the control lever into the detent position. Furthermore, if the implement is above the preselected lifted position and the operator moves the control lever to further raise the implement, the electromagnet will also be energized. This results in an undue waste of electrical energy and does not accurately reflect the operator's desired operation.

The present invention is directed to overcoming one or more of the problems set forth above.

DISCLOSURE OF THE INVENTION

The invention avoids the disadvantages of known control lever detent mechanisms and provides an electronic implement control that controllably actuates and deactuates a detent in a manner which reflects the operator's desired implement functions.

In one aspect of the present invention, an apparatus for controlling an implement connected to a work vehicle and movable to and between a plurality of positions is provided. A control lever is pivotably connected to a mounting bracket on the vehicle. A rocker bar is also connected to the control lever and is in contact with the actuator rod of a solenoid. A device is provided for producing a control signal in response to movement of the control lever. A resilient member is included for urging the actuator rod toward a detent position. A detent control actuates and deactuates the solenoid in response to the control signal and the position of the implement.

The invention also includes other features and advantages which will become apparent from a more detailed study of the drawings and specification.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
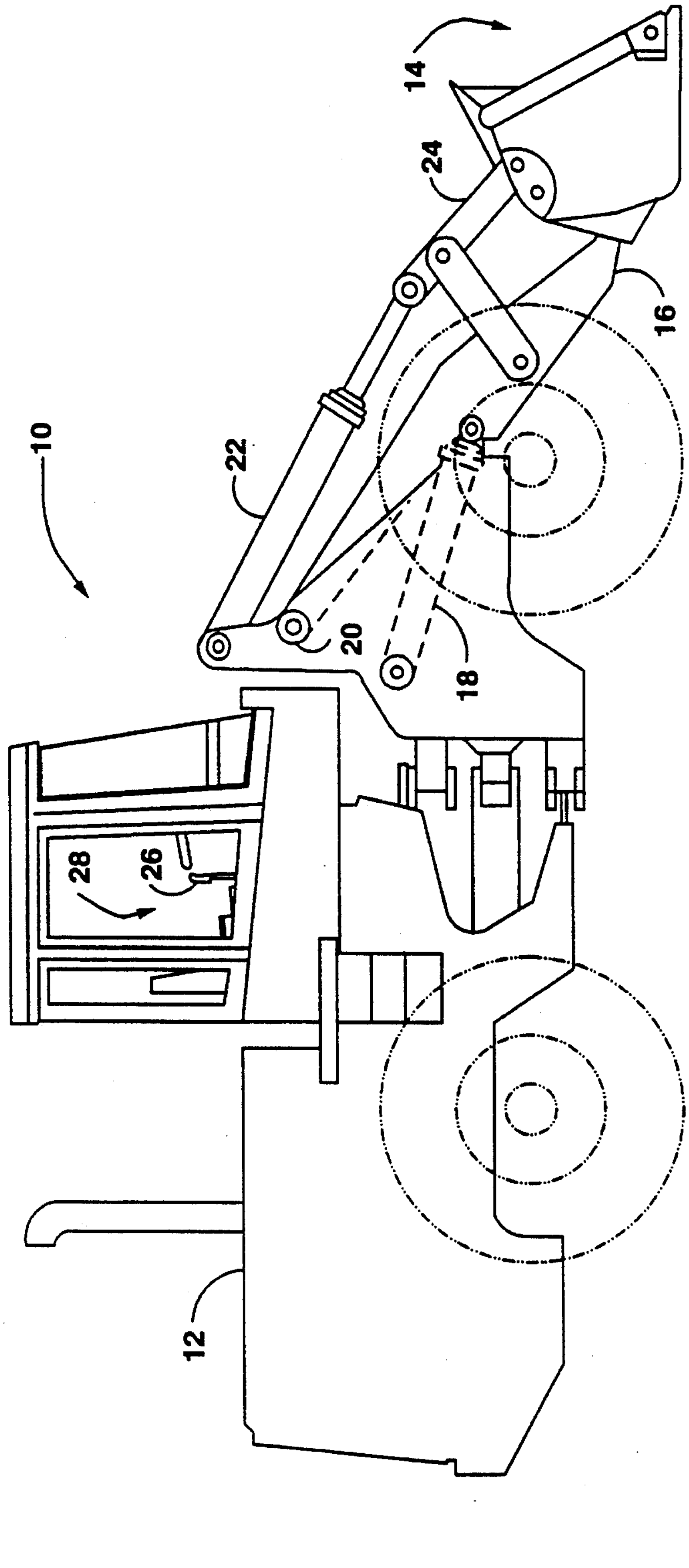
FIG. 1 is a side view of a loader vehicle embodying the invention.

In FIG. 1, an implement control system is illustrated generally by the number 10. Although FIG. 1 shows a wheel type loader vehicle 12 having an implement 14 in the form of a bucket, the present invention is equally applicable to vehicles such as track type loaders, hydraulic excavators, and other vehicles having hydraulically operated implements. The implement 14 is connected to a lift arm assembly 16, which is pivotally actuated by two hydraulic lift cylinders 18 (only one of which is shown) about a pair of lift arm pivot pins 20 (only one shown) attached to the vehicle frame. The implement 14 is pivotally mounted to the lift arms 16 and is connected to a pair of implement tilt cylinders 22 (only one shown) via a tilt linkage 24. The lift and tilt cylinders 18,22 are connected to a hydraulic circuit (not shown) and are extendable and retractable in response to movement of lift and tilt control levers 26 mounted at the vehicle operator's station 28.

Figure 2:
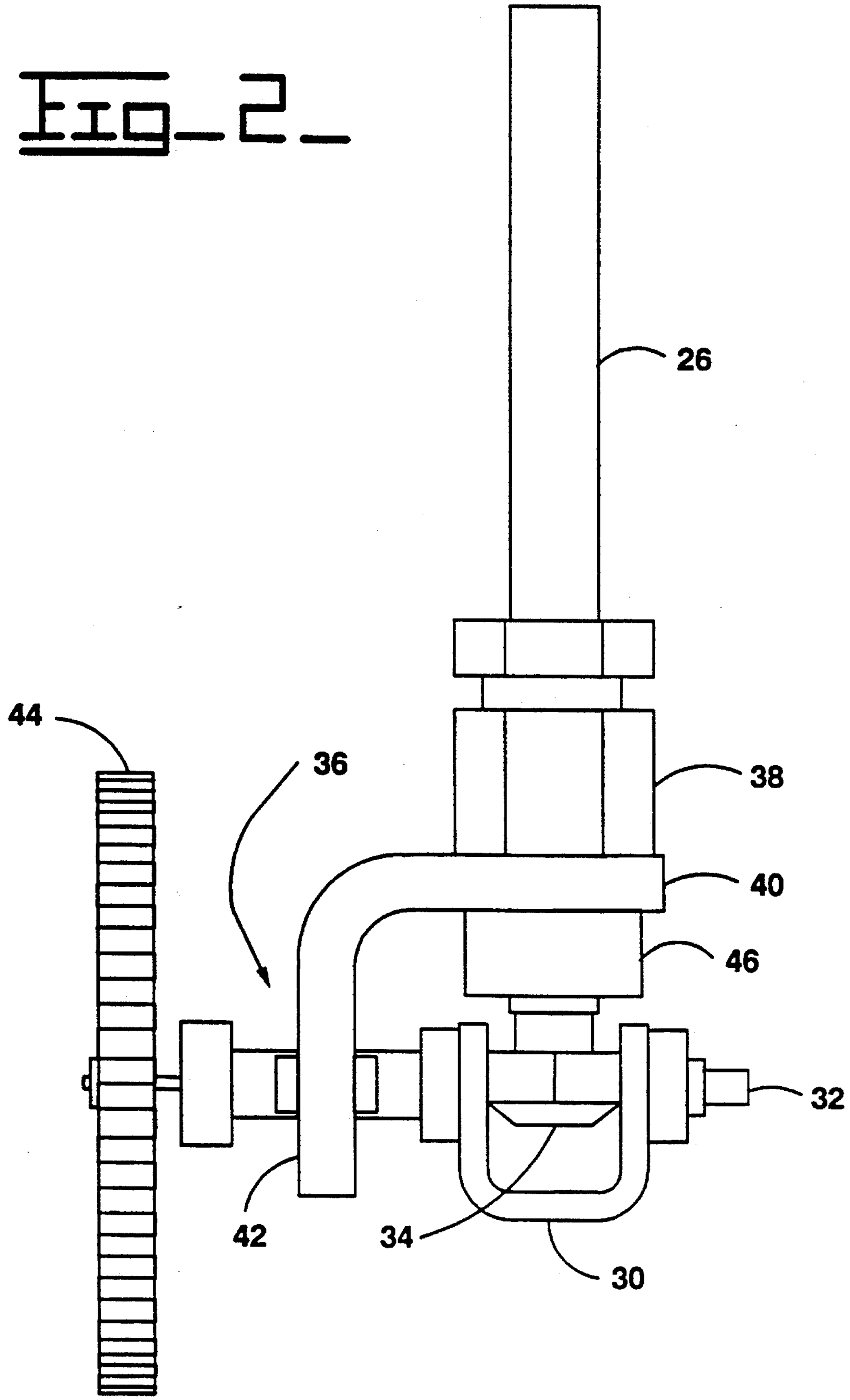
FIG. 2 is a diagrammatic view of the control lever, rocker bar, and shaft arrangement.

While the operation of an embodiment of the invention will only be described in connection with the control lever 26 associated with the lift cylinders 18, it should be appreciated that the embodiment associated with the tilt cylinders 22 operates in a similar manner. Referring now to FIG. 2, the control lever 26 is shown. A bracket 30 is connected to the vehicle 12 and includes a pair of holes through which a control shaft 32 extends. Bearings can advantageously be connected to and between the bracket 30 and the control shaft 32 to facilitate ease of rotational motion of the control shaft 32 within the bracket holes. The control lever 26 is connected to the control shaft 32 through a pivot bolt 34 and a coupler 36. In the preferred embodiment, the control lever 26 and the pivot bolt 34 both include threaded portions which are threadably engaged with a connecting nut 38. The control shaft 32 extends through the head of the pivot bolt 34 which includes a hole having a diameter that is slightly larger than the outer diameter of the control shaft 32. Preferably, there is a precision running fit between the control shaft 32 and the pivot bolt 34. Such an arrangement provides a common center of rotation for the control shaft 32 and the control lever 26.

The coupler 36 includes an upper portion 40 and a lower portion 42. The upper portion 40 is disposed adjacent the connecting nut 38 and includes an orifice through which the pivot bolt 34 extends. The control shaft 32 engages the coupler 36 and preferably extends through the lower portion 42 of the coupler 36. The coupler 36 is held in position with respect to the control lever 26 by being compressed between the connecting nut 38 and the rocker bar 46. A first gear 44 is attached to the control shaft 32 such that the first gear 44 is angularly displaced an amount being substantially equivalent to the angular displacement of the control shaft 32 and control lever 26.

A rocker bar 46 is connected to and between the pivot bolt 34 and the connecting nut 38. In the preferred embodiment, the rocker bar 46 is threadably engaged with the pivot bolt 34 and includes a recessed portion substantially equidistant from the two distal ends of the rocker bar 46. The recessed portion is configured to allow the rocker bar 46 to pivot through a predetermined range of motion without coming in contact with the bracket 30.

Figure 3:
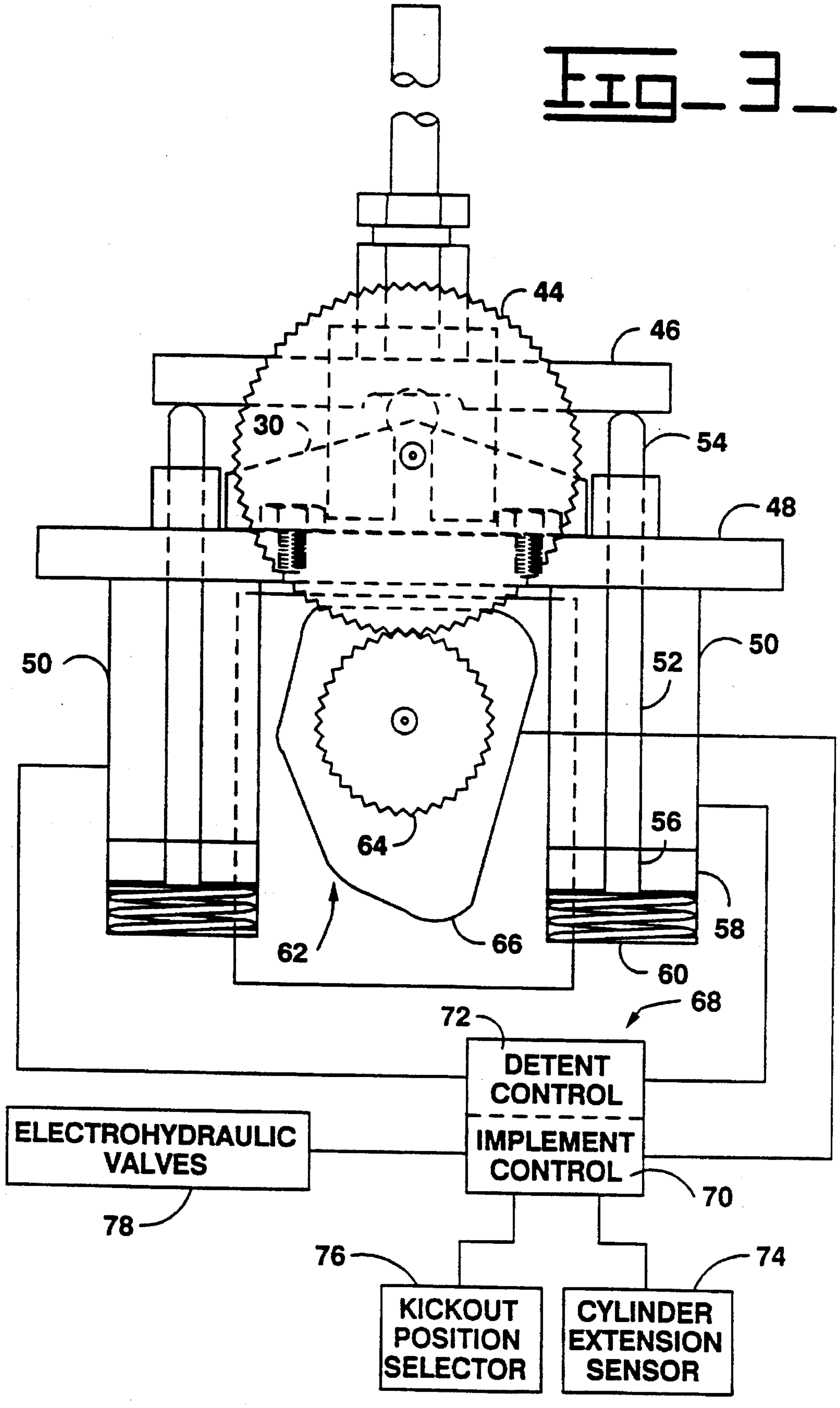
FIG. 3 is a schematic view of an embodiment of the invention including a reduced view of the control lever, rocker bar, and shaft arrangement shown in FIG. 2.

Referring now to FIG. 3, the control lever, rocker bar, and control shaft arrangement is shown connected to the vehicle 12 via a mounting plate 48. While the bracket 30 is preferably bolted to the mounting plate 48, nearly any means of fixedly connecting the bracket 30 and the mounting plate 48 would be satisfactory.

A pair of solenoids 50 are also connected to the mounting plate 48 in locations adjacent the distal ends of the rocker bar 46. While solenoids 50 are included in the preferred embodiment, any means for controllably moving a rod in response to an electrical signal would be operable in connection with the invention. The solenoids 50 each include a winding (not shown) that is in electromagnetic communication with an actuator rod 52.

Each actuator rod 52 is disposed in an orifice extending substantially through the respective solenoid 50 and is slidably movable within the orifice. The actuator rod 52 includes a first end 54 disposed adjacent the rocker bar 46 and a second end 56 having a flange and being disposed within a spring box 58. The spring box 58 includes a resilient member 60, preferably a compression spring, that is located adjacent the flange on the second end 56 and urges the actuator rod 52 in a direction toward the rocker bar 46. In this way, the actuator rod 52 is spring biased toward the rocker bar 46 such that the force exerted by the resilient member 60 is transferred to the rocker bar 46 and the control lever 26 via the actuator rod 52. Since each resilient member 60 has a spring constant that is substantially equivalent to that of the other resilient member 60, the control lever 26 is effectively spring biased in a neutral position. When the operator pivots the control lever 26 in either direction about the control shaft 32, the resilient members 60 resist that motion and return the control lever 26 to the neutral position when the operator releases the control lever 26. The stiffness of the resilient members 60 is chosen to provide an optimal operator feel.

When the solenoid winding is energized, the resulting electromagnetic field urges the actuator rod 52 toward the rocker bar 46 in a manner well-known in the art. Thus, force in addition to that of the resilient member 60 can be controllably applied to the rocker bar 46 by energizing the solenoid winding.

A means 62 for producing a control signal is connected to and between the vehicle 12 and the first gear 44. The control signal producing means 62 advantageously includes a rotary potentiometer 66 and a second gear 64 that is adapted to engage the first gear 44. The relative sizes of the first and second gears 44,64 are chosen such that as the control lever 26, and consequently the first gear 44, moves through the predetermined range of motion, the second gear 64 is moved through a range determined by the rotational limits of the rotary potentiometer 66. In the preferred embodiment, the rotary potentiometer 66 produces a pulse width modulated signal having a duty cycle that is dependent upon the angular position of the second gear 64 and is variable from 5% to 95%. The second gear 64 is positioned with respect to the first gear 44 and the rotary potentiometer 66 such that the duty cycle of the control signal is at approximately 50% when the control lever 26 is in the neutral position. When the control lever 26 is pivoted in one direction from the neutral position, the duty cycle of the control signal is less than 50%, and when the control lever 26 is pivoted in the other direction, the duty cycle is greater than 50%. While only a rotary potentiometer capable of producing a pulse width modulated signal is described, it should be appreciated that any device capable of producing an electrical signal in response to the pivotal motion of the control lever 26 would be operable with the instant invention.

A control system 68 includes an implement control 70 and a detent control 72 and is in electrical communication with the solenoids 50 and the control signal producing means 62. The implement control 70 delivers an implement signal to the electrohydraulic valves 76 to controllably extend and retract the lift cylinders 18 in response to the duty cycle of the control signal and hence the position of the control lever 26. The detent control 72 is provided to controllably energize and deenergize the solenoids 50.

The detent control 72 compares the duty cycle of the control signal to values corresponding to the control signal duty cycles when the control lever 26 is at predetermined raise and lower detent positions. If the duty cycle is less than or equal to the predetermined duty cycle for the control lever 26 being at the lower detent position, the detent control 72 actuates the lower detent solenoid to hold the control lever in that position until the lift arms are lowered to a preselected return to dig position. However, if the implement is already below the return to dig position, the solenoid 50 will not be actuated. If the duty cycle is greater than or equal to the predetermined duty cycle for the control lever 26 being at the raise detent position, the detent control 72 actuates the raise detent solenoid to hold the control lever 26 in that position until the lift arms are raised to a preselected dump position. However, if the implement is already above the dump position, the solenoid 50 will not be actuated.

A cylinder extension sensor 74 is connected to and between at least one of the two lift cylinders 18 and the control system 68 and produces a cylinder extension signal representative of the position of a cylinder rod within the cylinder 18. In the preferred embodiment, the cylinder extension sensor 74 is a radio frequency (RF) sensor disposed within the cylinder, but a sensor located external to the cylinder and performing a similar function would also be operable in connection with the control system 68. Likewise, a rotational sensor disposed adjacent the lift arm pivot pins 20 and which produces a signal in response to the angular position of the lift arm assembly 16 with respect to the vehicle 12 would also be operable with the instant invention.

A kickout position selector 76 is provided to allow the operator to select the positions of the lift arm assembly 16 corresponding to the desired positions of the implement 14 during the various work cycle functions and at which the detents are to be released. In the preferred embodiment, the kickout position selector 76 includes a push-button switch or other appropriate device (not shown) for producing a desired kickout signal in response to the operator's selections of desired kickout positions.

In response to receiving the desired kickout signal, the detent control 72 stores the present cylinder extension signal in memory. In the preferred embodiment, the cylinder extension signal is stored in memory at an upper kickout address if the signal is greater than a predetermined magnitude and is stored at a lower kickout address if the signal is less than the predetermined magnitude.

An electrohydraulic valve 78 is connected to and between the control system 68 and the lift cylinders 18. The electrohydraulic valve 78 is adapted to controllably direct pressurized fluid to the lift cylinders 18 in response to an implement signal that is produced by the implement control 70. The implement control 70 therefore causes the lift cylinders to extend and retract via operation of the electrohydraulic valve 78. Preferably, the implement control 70 sends a raise implement signal to the electrohydraulic valve when the duty cycle of the control signal is greater than 50% and sends a lower implement signal to the electrohydraulic valve in response to the duty cycle of the control signal being less than 50%. When the control signal duty cycle is approximately 50%, the implement control 70 causes the electrohydraulic valve to maintain the lift arm assembly in its present position with respect to the vehicle.

When the control lever 26 is moved to a position beyond the predetermined raise detent position, the detent control 72 compares the cylinder extension signal stored in the upper kickout address to the present cylinder extension signal being produced by the cylinder extension sensor. If the comparison between the cylinder extension signals indicates that the lift arm assembly 16 is below the preselected dump height, the detent control 72 actuates the appropriate solenoid 50 to maintain the control lever in the raise detent position. If the cylinder extension signal comparison indicates that the lift arm assembly 16 is already at or above the preselected dump height, the detent control 72 does not actuate either of the solenoids 50.

As the lift arm assembly 16 rises in response to the implement signal from the implement control 70, the detent control 72 continues to compare the present cylinder extension signal to the signal stored in the upper kickout address. When the cylinder extension signal is substantially equal to that stored in the upper kickout address, the detent control 72 deactuates the solenoid 50, the control lever 26 returns to the neutral position, and the implement control 70 returns the electrohydraulic valve 78 to a closed position at which the lift cylinders 18 are maintained in their present position.

To lower the lift arm assembly 16 to the return to dig position, the operator moves the control lever 26 to a position beyond the predetermined lower detent position. The control system 68 receives the control signal from the rotary potentiometer 66 and the implement control 70 responsively sends an implement signal to the electrohydraulic valves 78 to retract the lift cylinders 18. The detent control 72 compares the cylinder extension signal stored in the lower kickout address to the present cylinder extension signal being produced by the cylinder extension sensor. If the comparison between the cylinder extension signals indicates that the lift arm assembly 16 is above the preselected return, to dig height, the detent control 72 actuates the appropriate solenoid 50 to maintain the control lever in the lower detent position. If the cylinder extension signal comparison indicates that the lift arm assembly 16 is already below the preselected return to dig height, the detent control 72 does not actuate either of the solenoids 50.

As the lift arm assembly 16 is lowered in response to the implement signal from the implement control, the detent control 72 continues to compare the present cylinder extension signal to the signal stored in the lower kickout address. When the cylinder extension signal is substantially equal to that stored in the lower kickout address, the detent control 72 deactuates the solenoid 50, the control lever 26 returns to the neutral position, and the implement control returns the electrohydraulic valve 78 to a closed position at which the lift cylinders 18 are maintained in their present position.

In an alternative embodiment, the detent control 72 returns the control lever 26 to the neutral position before the lift arm assembly 16 reaches the preselected dump or return to dig height. In this case, the implement control 70 continues to produce the implement signal even though the rotary potentiometer 66 is no longer producing the control signal. After the control lever 26 returns to the neutral position, the implement control 70 modulates the implement signal to reduce the velocity of the lift arm assembly 16 before the electrohydraulic valve 78 is completely closed. Stresses on the hydraulic system and operator discomfort are therefore reduced by progressively reducing the velocity of the lift arm assembly 16 over a substantial distance.

To manually return the control lever to the neutral position, the operator exerts force on the control lever 26 toward the neutral position. The exerted force must be greater than the sum of forces being exerted by the resilient members and the actuated solenoid. As the control lever moves a short distance toward the neutral position, the detent control 72 deactuates the solenoid 50 in response to the control signal having a duty cycle substantially closer to the duty cycle corresponding to the neutral position.

Industrial Applicability

Vehicles such as wheel type loaders are typically operated in work cycles in which a lift arm assembly 16 is repetitively moved to and between a raised position and a lowered position. The raised and lowered positions are dependent upon a number of parameters which are application specific, e.g. the height of the walls of a truck being loaded and the location of the material to be loaded. The instant invention is particularly useful to controllably move the implement to and between the raised and lowered positions with relatively little operator attention. While the operation of the instant invention is described in connection with a truck loading cycle, it should be understood that the invention operates analogously when used in any work cycle.

The operator pivots the control lever 26 in the appropriate direction to raise the lift arms. When the lift arm assembly 16 reaches the desired dump height, the operator returns the control lever 26 to the neutral position and activates the kickout position selector 76 which responsively produces the desired kickout signal. When the control system 68 receives the desired kickout signal, the cylinder extension signal is stored in memory. Assuming the lift arm assembly 16 is above the predetermined position, the cylinder extension signal is stored in the upper kickout address. The operator then pivots the control lever 26 in the opposite direction to lower the lift arms. When the lift arm assembly 16 reaches the desired return to dig position, the operator returns the control lever 26 to the neutral position and once again actuates the kickout position selector 76. Assuming the lift arm assembly 16 is below the predetermined position, the cylinder extension signal is stored in the lower kickout address.

Following the above initialization process, the operator fills the bucket with material and begins the work cycle. If the operator does not move the control lever 26 beyond the predetermined raise and lower detent positions, the operator extends and retracts the lift cylinders 18 via the implement control 70 and electrohydraulic valves 78 in a manual mode. However, If the operator pivots the control lever 26 to a position beyond the predetermined raise detent position, the detent control 72 actuates the appropriate solenoid 50. When the cylinder extension signal is substantially equal to that stored in the upper kickout address, the detent control 72 deactuates the solenoid 50, the control lever 26 returns to the neutral position, and the electrohydraulic valve 78 returns to a closed position at which the lift cylinders 18 are maintained in their present position.

To lower the lift arm assembly 16 to the return to dig position, the operator moves the control lever 26 to a position beyond the predetermined lower detent position. When the cylinder extension signal is substantially equal to that stored in the lower kickout address, the detent control 72 deactuates the solenoid 50, the control lever 26 returns to the neutral position, and the electrohydraulic valve 78 returns to a closed position at which the lift cylinders 18 are maintained in their present position.

To manually return the control lever to the neutral position, the operator exerts force on the control lever 26 toward the neutral position. The resulting motion causes the detent control 72 to deenergize the appropriate solenoid.

The typical wheel type loader vehicle includes a control lever for the implement tilt hydraulic circuit in addition to the above described lever for the lift hydraulic circuit. The tilt control lever operates in an analogous fashion and will not be further discussed. Likewise, embodiments of the instant invention are usable with similar vehicles that perform repetitive functions with hydraulically operated implements, such as track type loaders, excavators, and backhoes. Similarly, the present invention is also operable with systems utilizing other motive means, such as pneumatic systems and electrically driven systems.

Other aspects, objects, and advantages of this invention can be obtained from a study of the drawings, the disclosure, and the appended claims.

We claim:

1. An apparatus for controlling an implement connected to a work vehicle and movable to and between a plurality of positions, comprising:

means for sensing the position of the implement and responsively producing an implement position signal;

a mounting bracket connected to the vehicle;

a control lever being pivotably connected to said mounting bracket and movable between first and second positions;

a rocker bar connected to said control lever;

means for producing a control signal in response to movement of the control lever;

a solenoid having an actuator rod being in contact with said rocker bar and movable to a detent position in response to said solenoid being energized; and detent control means for controllably energizing said solenoid in response to said control signal having a value indicative of the control lever being moved beyond a detent position and said implement position signal being indicative of the implement having a predetermined relationship with a set position and deenergizing said solenoid in response to the implement position signal being indicative of the implement having a second predetermined relation with said set position.

2. An apparatus (10), as set forth in claim 1, including:

an implement control (70) for receiving said control signal and responsively producing an implement signal; and means (18) for moving the implement (14) in response to the implement signal.

3. An apparatus for controlling an implement connected to a work vehicle and movable to and between a plurality of positions, comprising:

means for sensing the position of the implement and responsively producing an implement position signal;

means for selecting a desired kickout position;

a mounting bracket connected to the vehicle;

a control lever being pivotably connected to said mounting bracket and movable between first and second positions;

a rocker bar connected to said control lever;

means for producing a control signal in response to movement of the control lever;

a solenoid having an actuator rod being in contact with said rocker bar and movable to a detent position in response to said solenoid being energized;

a biasing means for urging said actuator rod toward said detent position; and detent control means for controllably energizing said solenoid in response to said control signal having a value indicative of the control lever being moved beyond a detent position and said implement position signal being indicative of the implement having a predetermine relationship with and deenergizing said solenoid in response to the implement being substantially in the desired kickout position.

4. An apparatus (10), as set forth in claim 3, including:

a control shaft (32) connected to and between said control lever (26) and said mounting plate (30) and having a longitudinal axis;

a first gear (44) connected to said control shaft (32) and being pivotally movable about said axis in response to movement of the control lever (26); and a second gear (64) connected to and between said first gear (44) and said control signal producing means (62).

5. An apparatus (10), as set forth in claim 3, wherein the control signal is a pulse-width modulated signal having a duty cycle being dependent upon the position of the control lever (26).

6. An apparatus (10), as set forth in claim 3, including:

an implement control (70) for receiving said control signal and responsively producing an implement signal; and means (18) for moving the implement (14) in response to the implement signal.

7. An apparatus for controlling an implement connected to a work vehicle and movable to and between a plurality of positions, comprising:

means for sensing the position of the implement and responsively producing an implement position signal;

a mounting bracket connected to the vehicle;

a control lever being pivotally connected to said mounting bracket and movable between first and second positions;

a rocker bar connected to said control lever;

means for producing a control signal in response to movement of the control lever;

an implement control for receiving said control signal and responsively producing an implement signal;

means for moving the implement in response to the implement signal;

a solenoid having an actuator rod being in contact with said rocker bar and movable to a detent position in response to said solenoid being energized; and detent control means for energizing said solenoid in response to said control signal having a value indicative of the control lever being moved beyond a lower detent position and said implement position signal being indicative of the implement being below a predetermined return-to-dig position and for de-energizing said solenoid in response to the implement position signal being indicative of the implement being a predetermined distance below the predetermined return-to-dig position.

8. An apparatus (10), as set forth in claim 7, including means (76) for selecting a desired implement kickout position wherein the detent control means (72) deenergizes said solenoid (50) in response to the implement (14) being substantially in the kickout position.

9. An apparatus, as set forth in claim 7, including means for selecting a desired implement kickout position.

10. An apparatus (10), as set forth in claim 7, wherein:

said detent control means (72) energizes said solenoid (50) in response to said control signal having a value indicative of the control lever being moved beyond a raise detent position and said implement position signal being indicative of the implement being below a predetermined dump height and deenergizes said solenoid (50) in response to the implement position signal being indicative of the implement being a predetermined distance below the predetermined dump height; and said implement control (70) produces said implement signal such that the implement (14) is moved to substantially the dump height.

11. An apparatus, as set forth in claim 7, wherein:

said implement control produces said implement signal such that the implement is moved to substantially the return-to-dig position.

12. An apparatus (10), as set forth in claim 7, including:

a control shaft (32) connected to and between said control lever (26) and said mounting plate (30) and having a longitudinal axis;

a first gear (44) connected to said control shaft (32) and being pivotally movable about said axis in response to movement of the control lever (26); and a second gear (64) connected to and between said first gear (44) and said control signal producing means (62).

13. An apparatus for controlling an implement connected to a work vehicle and movable to and between a plurality of positions, comprising:

means for sensing the position of the implement and responsively producing an implement position signal;

means for selecting a desired kickout position;

a mounting bracket connected to the vehicle;

a control lever being pivotably connected to said mounting bracket and movable between first and second positions;

a rocker bar connected to said control lever;

a control shaft connected to and between said control lever and said mounting plate and having a longitudinal axis;

a first gear connected to said control shaft and being pivotally movable about said axis in response to movement of the control lever;

means for producing a control signal in response to movement of the control lever;

a second gear connected to and between said first gear and said control signal producing means;

an implement control for receiving said control signal and responsively producing an implement signal;

means for moving the implement in response to the implement signal;

a solenoid having an actuator rod being in contact with said rocker bar and movable to a detent position in response to said solenoid being energized;

a biasing means for urging said actuator rod toward said detent position; and detent control means for controllably energizing said solenoid in response to said control signal having a value indicative of the control lever being moved beyond a raise detent position and said implement position signal being indicative of the implement being below a predetermined dump height and deenergizing said solenoid in response to the implement being substantially in the desired kickout position.

14. An apparatus, as set forth in claim 13, wherein said detent control means and deenergizes said solenoid in response to the implement position signal being indicative of the implement being substantially at the predetermined dump height.

15. An apparatus (10), as set forth in claim 13, wherein said detent control means (72) energizes said solenoid (50) in response to said control signal having a value indicative of the control lever being moved beyond a lower detent position and said implement position signal being indicative of the implement being above a predetermined return-to-dig position and deenergizes said solenoid (50) in response to the implement position signal being indicative of the implement being substantially at the predetermined return-to-dig position.

* * * * *